Sept. 28, 1943.  R. ESNAULT-PELTERIE  2,330,569
APPARATUS FOR CONTROLLING LAND, MARINE, AND AERIAL VEHICLES
Filed May 27, 1939  2 Sheets-Sheet 1
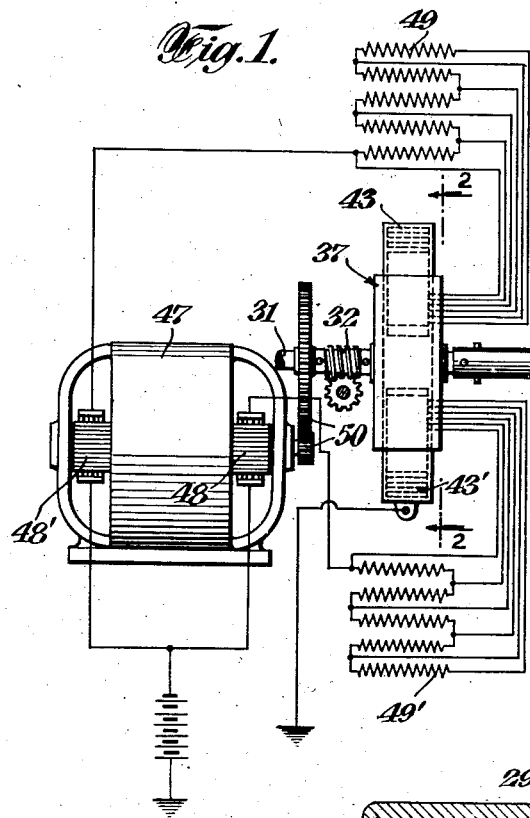
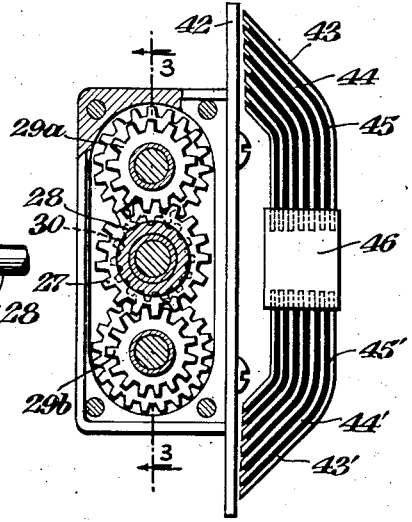
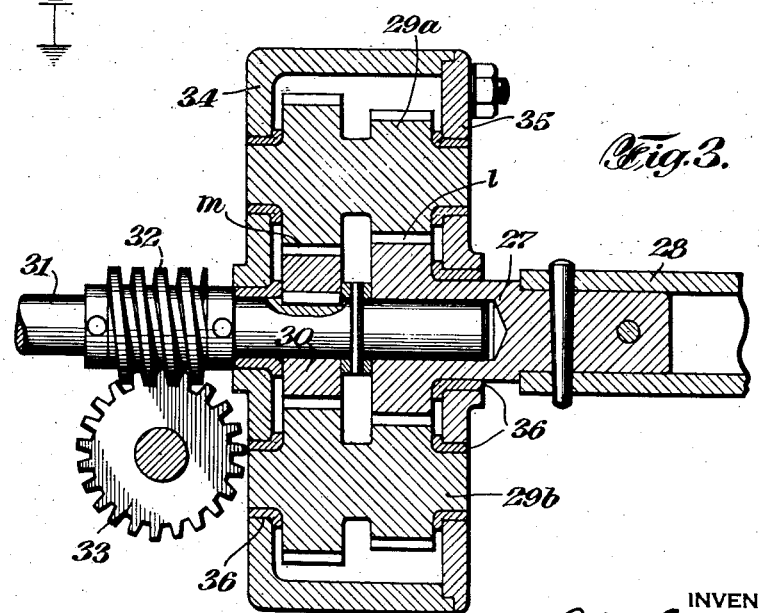
INVENTOR
Robert Esnault Pelterie
BY Kenyon Kenyon
ATTORNEYS

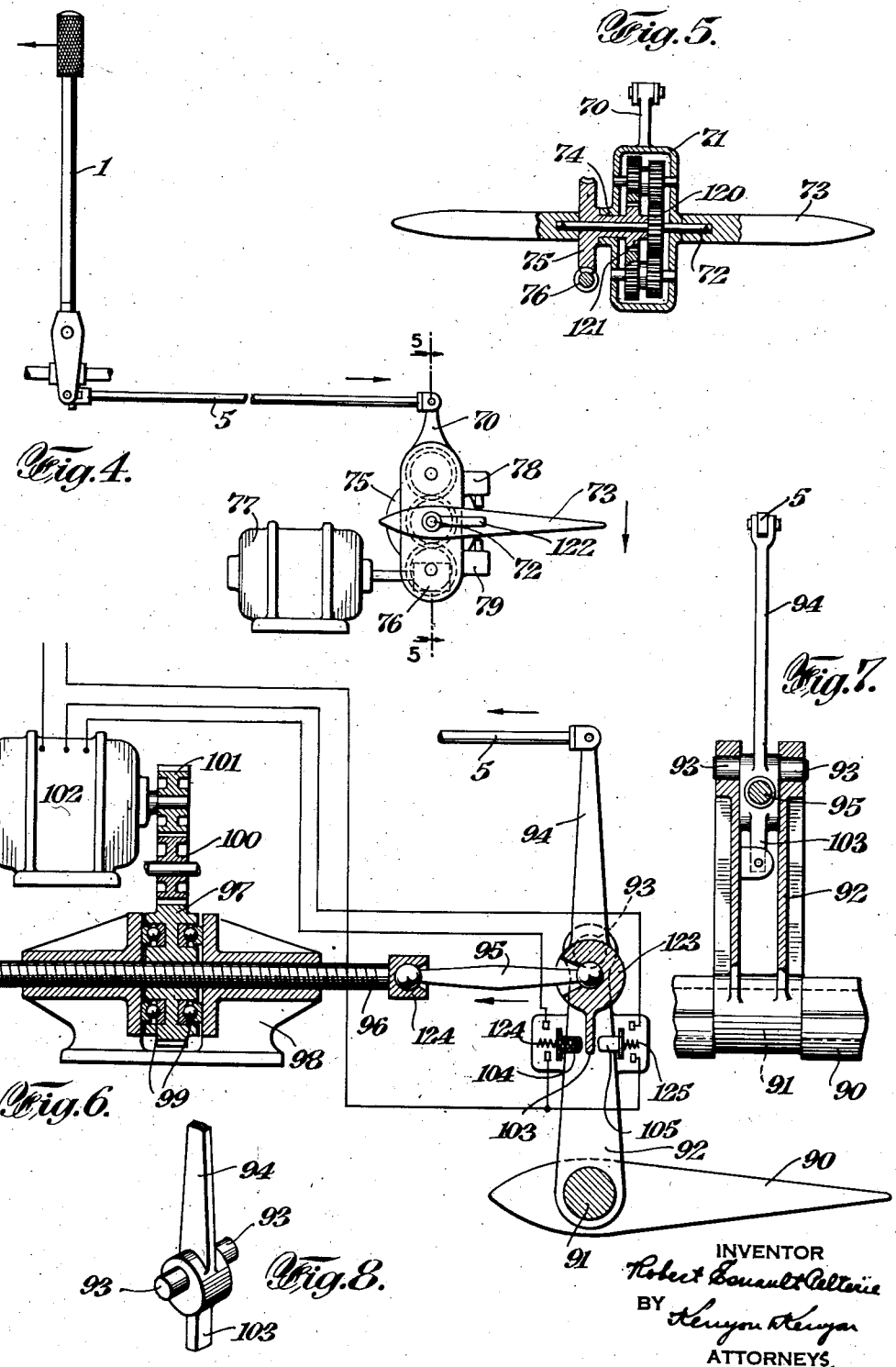

Patented Sept. 28, 1943

2,330,569

UNITED STATES PATENT OFFICE 2,330,569

APPARATUS FOR CONTROLLING LAND, MARINE, AND AERIAL VEHICLES

Robert Esnault-Pelterie, Boulogne-Billancourt, France; vested in the Alien Property Custodian Application May 27, 1939, Serial No. 276,250
In Switzerland May 30, 1938

10 Claims. (Cl. 172—239)

This invention relates to control apparatus for land, marine or aerial vehicles. It relates especially to control apparatus comprising a servo-power device which is brought into operation by operation of a manually movable part, said servo-power device being arranged so as to actuate a control for the vehicle such as a rudder, aileron, elevator, guiding wheel or the like.

In my simultaneously executed application for Control apparatus for land, marine and aerial vehicles (Serial No. 276,249, filed May 27, 1939), I have illustrated several embodiments of this invention particularly with reference to servo-power devices that are hydraulically operated. In the present application embodiments of this invention are illustrated wherein the servo-power device is electrically operated.

In my said application I have described in detail many of the purposes and features of my invention and for this reason reference is specifically made to the said application and the disclosure in said application is to be deemed to be incorporated herein.

In the present application means are shown whereby an electrical servo-power device is arranged to actuate a control for a vehicle with a force that is dependent upon the force applied to a manually movable part of the vehicle.

Further features of this invention relate to the incorporation of an electrical servo-power device in a manually operable force applying system so that a component of the force required in moving the control for the vehicle is transmitted to the operator and so that notwithstanding the servo action of the servo-power device the operator is enabled to obtain the "feel" of the control even though the power that has to be exerted by the operator is materially diminished by the action of the servo-power device.

Other features of this invention relate to the force applying system used in conjunction with the electrical servo-power device including lever or gear arrangements for effecting improved responsiveness to the actuation by the operator of a manually movable part of the control apparatus.

Further purposes, features and advantages of this invention will be apparent in connection with the following description of certain illustrative embodiments of this invention shown in the accompanying drawings, wherein Figure 1 is a schematic representation of one embodiment of a servo control apparatus according to this invention;

Figure 2 is a detail view in elevation taken on the line 2—2 of Figure 1;

Figure 3 is a sectional elevation of the gearing shown in Figure 2 taken on the line 3—3, together with appurtenant parts;

Figure 4 is a diagrammatic representation of another embodiment of this invention, utilizing an electric motor as a servo-power device;

Figure 5 is a section along the line 5—5 of Figure 4;

Figure 6 is a diagrammatic view of a further embodiment of this invention wherein the manual force applying system comprises a lever system;

Figure 7 is a side elevation of the lever system shown in Figure 6; and

Figure 8 is a detail fragmentary perspective view of a member forming a part of the lever system shown in Figures 6 and 7.

In the device shown in Figures 1, 2 and 3 control apparatus according to this invention is shown for purposes of illustration in connection with the control system for a heavy motor vehicle such as a truck, for example. The shaft 28 is rigidly connected to any suitable manually movable part such as a steering wheel (not shown) and may be mounted for rotation in suitable bearings (not shown). The shaft 28 is connected to a shaft 31 through a gear train mounted in a rotatable support indicated generally by the reference character 37 in Figure 1. A worm 32 is keyed to the shaft 31 and is adapted to operate a worm wheel 33 from which a control for the vehicle such as a guiding wheel can be operated in any desired manner. Of course the means for actuating a control responsive to rotation of shaft 31 may comprise other power transmission means than a worm and worm wheel arrangement.

The gear train is shown in detail in Figure 3 as comprising coaxial pinions 27 and 30 of somewhat different sizes, the pinion 27 being connected to shaft 28 for rotation therewith and the pinion 30 being keyed to the shaft 31. Rotatable about the axis of shafts 28 and 31 is a box 34 having a cover 35, said box and cover constituting a support in which integral planetary pinion groups 29a and 29b are rotatably mounted so that power can be transmitted from the shaft 28 to the shaft 31. Since the transmission ratio is other than unity a force applied tending to rotate shaft 28 which is resisted by shaft 31 tends to set up a torque tending to rotate the gear box or support about the axis of shafts 28 and 31, the direction of rotation of the box relative to the direction of rotation of shaft 28 being dependent upon whether the transmission ratio of the gear train is greater or less than unity. The gear train in the arrangement described is part of a manually operable force applying device for actuating the control of the vehicle and the support or box acts as a lost motion member in the device. The gear train box 37 enclosing the train of gearing has fastened thereto a conductive plate 42 connected to one of the poles of a direct current motor 47, which has two rotor windings and two commutators 48 and 48', enabling it to run in one direction or the other, depending upon whether the one or the other of the commutators is in circuit. Opposite this plate 42 are situated the conductive strips 43 and 43', 44 and 44', etc., in the form of springs, and constitute the contact studs of two starting rheostats 49 and 49' for each of the circuits of the motor 47. These strips are insulated relatively to one another by other non-conductive strips, such as 45 and 45', and by their mount 46. The conductive strips, which form a progressive spring, are disposed in such a manner as to be put progressively into circuit so as to increase the electric current as the rotary effort of the box 37 about the axis 28 increases. Depending upon whether this rotary effort is exerted in one direction or the other, one or the other of the induced windings is put into circuit with the corresponding rheostat, and the motor is caused to run in one direction or the other.

This motor through the intermediary of a suitable reduction (a train of gearing 50, for example) thus acts progressively on the driven shaft 31 in the desired direction so as to aid the driver's operation.

In this form of construction, the way in which the functioning occurs is the following:

It being supposed that the distance between the points $l$ and $m$ of Figure 3 is small (one or two teeth different in each pair of gearings), the least displacement of the point $l$ relatively to the point $m$ will cause a great angular displacement of the box 37. This great angular displacement naturally corresponds to a small force moment. It is therefore apparent that the strips 44 of Figure 2 do not need to have very great strength to resist the tendency of the box 37 to rotate.

Making contact one after the other with the part 42 as they yield to the pressure of the box 34, which in the case of Figure 3 tends to turn in the same direction as the shaft 28, these strips successively eliminate sections of resistance of the rheostat 49, which is connected in series with one of the windings of the electric motor.

This electric motor can drive the shaft 31 in the same direction as that in which the shaft 28 is urged, by a gear-down system that should be reversible in order that the control may not be locked in the event of a breakdown of this motor.

Figures 4 and 5 show a further construction embodying this invention which, for purposes of exemplification, constitute part of means for controlling the longitudinal equilibrium of an aeroplane.

In Figures 4 and 5 the lower end of the joy-stick 1 is connected by a rod 5 to an arm 70 fixed to the casing of an epicyclic gear train box 71 of the general construction described in connection with Figure 3. The shaft 72 to which the pinion 120 of the epicyclic gearing is keyed carries the elevator 73 while the concentric hollow shaft 74 to which the pinion 121 is keyed carries a worm wheel 75 meshing with a worm 76 mounted on the shaft of a reversible electric motor 77. The casing or support 71 of the epicyclic gear train carries two abutments 78 and 79 in the form of electric switches controlling the operation of the motor 77 in the one direction or the other. The abutments 78, 79 cooperate with a suitable stop member 122 mounted on the shaft 72.

In this construction the epicyclic gear train and box act as the equivalent of a balance lever to three points of which are applied respectively the manual effort, the effort of the servo motor and the resistance to be overcome. The joystick 1 is therefore always subjected to a reaction proportional to the resistance to be overcome.

If the worm gearing 75—76 is made irreversible and if the motor 77 happens to fail, the pilot can go on handling his machine but a given angle of displacement of the hand operated organ only communicates then a smaller corresponding angle of displacement to the driven organ so that the pilot has a sufficient strength for performing it, and the machine is not disabled. But when designing such a mechanism, it appears that such a gearing system can only be realised for semi-heavy machines where the gearing ratio between the hand operated organ and the driven organ is not too large, otherwise the dimensions and weight of the gear wheels become inacceptable.

In the case of particularly large crafts it is advisable to replace the epicyclic gear train by lever arms because in such cases the gear wheels required would attain unacceptable dimensions.

A construction of this kind, namely, employing lever arms, is shown in Figures 6 to 8 in which the elevator 90 is mounted upon a shaft 91 journalled in suitable bearings (not shown). Fixed to the shaft 91 are parallel lever arms 92 provided at their upper ends with bearings for trunnion-like projections 93 from the lower end of a lever 94. The upper end of the lever 94 is connected to the operating rod 5 and the lower end is provided at a short distance below the axis of the trunnions 93 with a spherical socket 123 adapted to receive one end of a ball-ended connecting rod 95 the other end of which is similarly held in a spherical socket 124 formed at the end of a screw-threaded shaft 96. The shaft 96 is threaded in a nut 97 having gear teeth around its periphery and mounted in a body 98 between thrust bearings 99. The nut 97 is driven through spur gears 100, 101 by a reversible electric motor 102. The lower end of the lever 94 is provided with a projection 103 movable between abutments 104, 105 mounted on one of the lever arms 92 and constructed in the form of electric switches controlling the operation of the motor 102 in one direction or the other, the arrangement being such that when due to the action of the pilot on the joy-stick the lever 94 is moved so that the projection 103 is brought into contact with one of the said abutments, the motor is set running in the direction tending to return the lever 94 into its previous angular relation to the lever 92 and therefore to move the projection away from the said abutment. It will be readily understood that this mechanism is an exact equivalent to that shown in Figures 4 and 5 and works in exactly the same way.

At any time during the operation the pilot feels a reaction which is proportional to that of the resistance of the elevator, the ratio of these reactions being determined by the relative lengths of the arms of the lever 94.

The abutments 104, 105 contain springs 124, 125, the stiffness of which must be sufficient to prevent the pilot displacing the joy-stick very abruptly without feeling any resistance at all. On account of these springs the pilot feels a resistance even if the elevator has not yet moved sufficiently to gain incidence. Such artificial resistance vanishes when the electrical contact is broken and the pilot then again only feels the desired fraction of the reaction of the elevator. The yieldability of the springs 124, 125 also permits the lever 94 to be rocked relatively to lever 92 in the event there is a failure of electric power that leaves the rod 95 in fixed position. In such case by moving the lever 94 through a relatively large degree of angular movement the lever 92 can be rotated about shaft 91 with a large leverage in favor of the operator so that some degree of control can be attained by manual operation of the joy-stick.

In the case of exceptionally heavy machines it may be advisable to duplicate the mechanisms at least in their most delicate parts.

In the cases where a failure in the power supply results in the stoppage of an irreversible device, it is to be understood that such stoppage can occur out of the medium position of said irreversible device. In this case the continuation of the controlling is only normal in the case when the hand operated organ has in itself no definite medium position; viz: in the case of a hand-wheel.

In the case when a lever (joy-stick) is used means for freeing the irreversible device and allowing it to automatically come back to its medium position and be held firm in said medium position must be provided, such for example as thus described in my concurrently executed application, Serial No. 276,249 filed May 27, 1939.

It will be understood that the accompanying drawings are given by way of example and are intended to be diagrammatic only and do not purport to show the different members in correct relative proportions. It will also be understood that variations in the illustrated devices may be made without departing from the inventive idea and that other lever systems and gearing arrangements such as those described in my aforesaid application may be also used in embodiments of this invention defined in the following claims.

I claim:

1. Control apparatus for a land, marine or aerial vehicle which comprises a control for the vehicle, an electrically operable servo-power device, a manually operable force-applying device arranged to actuate said control comprising a gear train connecting a manually operable part to a driven member adapted to actuate said control, said gear train having a transmission ratio other than unity and being mounted upon a support so that said support tends to rotate between limits of lost motion when a force applied to said manually operable part is resisted by said driven member, and means for establishing and disestablishing electrical connection for operating said electrical servo-power device responsive to movement of said support within the limits of lost motion of said support.

2. Control apparatus for a land, marine or aerial vehicle which comprises a control for the vehicle, an electric motor, means for actuating said control by said motor through a gear train having a transmission ratio other than unity, said gear train being mounted on a support adapted to rotate when a force applied by said motor through said gear train is resisted by said control, a manually operable part operatively connected to said support to rotate said support, and means responsive to relative movement of said support and a movable member whose position is determined by the position of said control for energizing and de-energizing an electrical circuit adapted to actuate said motor.

3. Control apparatus for a land, marine or aerial vehicle including a control for the vehicle, an electrically operated servo-power device and a manually movable part, the combination comprising a gear train coupled to said manually movable part, a movable member coupled to said gear train, said member being movable within limits of lost motion in response to movement of said manually movable part with a force that is proportional to the force applied to said manually movable part, an electrical circuit arranged to operate said electrically operated servo-power device from a source of electrical power, electrical resistance means in said circuit, and progressive contact means electrically connected with said resistance means, said contact means being responsive to movement of said member to control the amount of electrical resistance and consequently of current in said circuit depending upon the amount of force tending to move said member.

4. Control apparatus for a land, marine or aerial vehicle comprising a control for the vehicle, a driven member, means to actuate said control upon actuation of said driven member, a manually movable part, mechanical means for transmitting force from said manually movable part proportionally to said driven member and to a second member adapted to be moved with a force that is directly proportional to the force applied to said manually movable part, an electrically operable servo-power device arranged to actuate said driven member, an electric circuit for said servo-power device, electrical resistance means in said circuit and progressive, resilient, switching means electrically connected to said resistance means and responsive to movement of said second member to vary said electrical resistance means whereby to energize said servo-power device so that the force supplied by said device to actuate said driven member is substantially in a predetermined ratio to the force tending to actuate said driven member supplied by said manually movable part.

5. Control apparatus for land, marine or aerial vehicle comprising a control for the vehicle, an electrically operable servo-power device mechanically interconnected with said control, a manually operable handle, an electrical circuit including a source of electrical energy and a pair of relatively movable contacts and said servo-power device, and common means adapted on preliminary movement of said handle to transmit manual effort from said handle to said control tending to move said control in a desired direction, and adapted upon further movement of said handle to move one of said contacts relative to the other, the relative movement of said contacts energizing the servo-power device in a manner causing said device to supply power to move said control in the same direction, whereby a portion of the resistance to actuation of said control is transmitted to the operator through said handle and the balance of said resistance is taken by the servo-power device, and said common means being adapted to afford increased leverage in favor of the operator upon failure of energy supply to said servo-power device.

6. Control apparatus for land, marine or aerial vehicle comprising a control for the vehicle, an electrically operable servo-power device mechanically interconnected with said control, a manually operable handle, an electrical circuit including a source of electrical energy, and a servo-power device and resistance means and resilient progressive contact means adapted to vary the amount of said resistance means to increase the energization of said servo-power device in response to increased deflection of said contact means, and common means comprising a gear train adapted on movement of said handle to increase the deflection of said contact means in proportion to increased manual effort applied to said handle and to transmit manual effort from said handle to said control tending to move said control in a desired direction, the energization of said servo-power device causing said device to supply power to move said control in the same direction, whereby a portion of the resistance to actuation of said control is transmitted to the operator through said handle and the balance of said resistance is taken by the servo-power device.

7. In apparatus as per claim 3, in which said progressive contact means comprises a plurality of insulatively-separated conductive strips in the form of springs, each connected to a portion of said resistance means and disposed in such a manner as to be put progressively into the electrical circuit upon movement of said movable member.

8. In apparatus as per claim 4, in which said progressive, resilient, switching means comprises a plurality of conductive strips, each connected to a portion of said resistance means and so disposed as to be put progressively into the electric circuit upon movement of said second member.

9. Control apparatus for a land, marine or aerial vehicle which comprises a control for the vehicle, a shaft rotation of which results in movement of said control, a manually operable part, balance lever means operatively connected with said shaft, a motor, means for exerting a force on said balance lever means at one point responsive to operation of said motor to rotate said shaft under motor power, means for exerting a force on said balance lever means responsive to application of force to said manually operable part, said last-named force being applied to balance lever means at a point other than said first-named point and in a direction to oppose the tendency of power supplied by said motor to cause relative rotation of said balance lever means with respect to said shaft, and means responsive to movement within limits of said balance lever means for energizing and de-energizing an electrical circuit adapted to actuate said motor.

10. Control apparatus for a land, marine or aerial vehicle which comprises a control for the vehicle, an electrically operable servo-power device, a manually operable force-applying part, a driven member adapted to actuate said control, a gear train connected to said driven member, said gear train having a transmission ratio other than unity and being mounted upon a support so that said support rotates when a force is applied to said manually operable part, said driven member tending to resist movement of said manually movable part, and means for establishing and disestablishing electrical connection for operating said electrical servo-power device, said casing and said means having lost motion between them, and said means being responsive to movement of said support within the limits of lost motion of said support with respect to said means.

ROBERT ESNAULT-PELTERIE.